3,544,526
POLYAMIDES
David Kirkaldy, Raglan, England, assignor to Imperial Chemical Industries Limited, London, England, a corporation of Great Britain
No Drawing. Filed July 17, 1967, Ser. No. 653,639
Claims priority, application Great Britain, Aug. 3, 1966, 34,801/66
Int. Cl. C08g 20/00
U.S. Cl. 260—78         1 Claim

ABSTRACT OF THE DISCLOSURE

Copolyterephthalamides derived from terephthalic acid, dodecamethylenediamine and 15% to 45% of a polymethylenediamine having from 6 to 10 methylene groups, such as octamethylenediamine, gamma-methyl hexamethylenediamine and hexamethylenediamine. The use of the copolyterephthalamides in the manufacture of filaments by melt spinning is also disclosed.

---

This invention relates to improvements in the manufacture of polyamides and more particularly to the manufacture of high molecular weight synthetic linear copolyterephthalamides capable of being melt-spun.

Polyterephthalamides, e.g., polydodecamethylene terephthalamide possess commercially useful properties notably a high initial modulus and tenacity of importance in tire cord and good stability due to the presence of the arylene link, but the high viscosity of the molten polymer often makes melt-spinning unsatisfactory or impossible. If higher temperatures are used to reduce the viscosity of the melt thermal degradation is encountered.

It has now been found that this drawback can be avoided without sacrificing the requisite properties if particular copolyterephthalamides are employed namely those derivable by polycondensation from terephthalic acid and dodecamethylene diamine in conjunction with 15–45 mole percent thereof of one more polymethylene diamines possessing from six to ten methylene groups or a methyl derivative thereof. Not only are the present copolyterephthalamides capable of being melt-spun into useful filaments in a practical efficient manner, but they have the additional advantage that the process of polycondensation by which they are manufactured does not require the high temperatures and pressures needed to make the homopolyterephthalamides. The copolyterephthalamides may be made by heating in substantially equivalent proportions the mixed amines and terephthalic acid, or polyamides-forming functional derivatives thereof, or the salt derived from the acid and the amines.

Accordingly the invention consists of a process for the manufacture of copolyterephthalamides comprising heating to polymerisation temperatures as such, or in the form of a polyamide-forming functional derivative thereof, substantially equivalent proportions of terephthalic acid and dodecamethylene diamine in conjunction with from 15 to 45 molar percent thereof of a polymethylene diamine possessing from six to ten methylene groups or a methyl derivative of said polymethylene diamine.

The invention includes copolyterephthalamides derivable by polycondensation from terephthalic acid, dodecamethylene diamine and 15–45 mole percent thereof of one or more polymethylene diamines possessing from six to ten methylene groups or a methyl derivative thereof. More specifically, the invention provides fiber forming copolyterephthalamides consisting essentially of alkylene terephthalamide repeating units wherein the alkylene groups are a mixture consisting of dodecamethylene and 15 to 45 molar percent of a member of the group consisting of hexamethylene, heptamethylene, octamethylene, decamethylene, gammamethyl hexamethylene, gammamethyl heptamethylene and gamma-methyl octamethylene.

The invention also includes melt-spinning the above copolyterephthalamides into filaments, ribbons, films and other elongated articles.

Suitable polymerisation temperatures are known in the art; such temperatures commonly range from 250° C. to 350° C. The polymerisation may, if desired, be performed continuously by the process described in British specification No. 1,030,344.

The polymethylene diamines, for use with the dodecamethylene methylene diamines include, for example, hexamethylene diamine
heptamethylene diamine
octamethylene diamine
decamethylene diamine
gamma-methylhexamethylene diamine
gamma-methylheptamethylene diamine
gamma-methyloctamethylene diamine.

The preferred molar proportion thereof is 20–30% calculated on the dodecamethylene diamine.

DEFINITIONS

Extensibility

By extensibility of the filaments is meant the length by which they can be extended before they break expressed as a percentage of their original length.

Tenacity

The breaking load of the filaments expressed in gms. per denier.

Initial modulus

By initial modulus of the filaments is meant the quotient obtained by dividing the specific stress by the strain, when the strain is caused by extending the filaments by 1% of their original length. (Specific stress is defined at page 138 of the "Textile Terms and Definitions," 4th edition, published by the Textile Institute, Manchester, and may be expressed in gms. per denier.)

Inherent viscosity

The phrase "Inherent Viscosity" employed below signifies twice the natural logarithm of the quotient of the viscosity at 25° C. of a solution of ½% weight by volume of the terephthalamide dissolved in dichloroacetic acid, divided by the viscosity of dichloroacetic acid at 25° C.

Vicat softening point

The Vicat softening points alluded to have been determined by a penetrometer similar to the apparatus described by Edgar and Ellery at page 2638 of the Journal of the Chemical Society 1952.

In the present process of manufacture of polyamides there may be included in the reaction mixture monofunctional compounds in small quantity notable monobasic or dibasic acids, e.g., acetic acid, terephthalic acid in order to prevent polymerisation proceeding beyond the desired degree at elevated temperatures, for example when the polyamide is held molten for the purpose of melt-spinning. Such monofunctional compounds are known as viscosity stabilisers. Other adjuvants may also be added at any convenient stage of the process, for instance: dyes, pigments, dyestuff formers, heat stabilisers, light stabilisers, plasticisers, delustrants, polyamide and other resins.

In the following examples which are by way of illustrating, not limiting, the invention, the parts are parts by weight.

EXAMPLE 1

1468 parts of dodecamethylenediammonium terephthalate, 532 parts of octamethylenediammonium terephthalate and 28.5 parts of terephthalic acid are heated with 1000 parts of water during 2 hours to 210° C. in an autoclave, the pressure reaching 250 lbs./sq. in., this being the maximum allowed by an automatic vent valve. The temperature is raised to 250° C. during 1 hour while the pressure is maintained, and further increased to 280° C. during 1 hour while the pressure is released. A final temperature of 295° C. is attained in 35 minutes at atmospheric pressure under nitrogen and the autoclave then allowed to cool. Total reaction time 4 hours 35 minutes.

The resulting copolyterephthalamide has an inherent viscosity of 0.52 and a vicat softening point of 271° C. The copolymer is rod spun at 285° C. into a yarn of 5 filaments, which is drawn to 5 times its original length over a hot plate at 180° C. The filaments have the following properties: Tenacity, 5.33 gms./denier; extensibility, 9.9%; initial modulus, 0.68.

EXAMPLE II

Example I is repeated with the following starting materials:

1300 parts dodecamethylenediammonium terephthalate
700 parts gamma-methylhexamethylenediammonium terephthalate
17.7 parts terephthalic acid
1000 parts water.

The resulting copolyterephthalamide has an inherent viscosity of 0.70, and a vicat softening point of 268° C. The copolymer is rod spun at 302° C. into yarn (intrinsic viscosity 0.74) which after drawing as before has these properties: tenacity, 5.26 gms./denier; extensibility, 9.3%; initial modulus, 0.66.

EXAMPLE III 1484 parts of dodecamethylenediammonium terephthalate, 516 parts of gamma-methylhexamethylenediammonium terephthalate and 20.1 parts of terephthalic acid are heated with 1000 parts of water during 3 hours to 250° C., the pressure reaching its maximum (controlled by automatic valve) of 250 lbs./sq. in. in 2 hours. The reaction mixture is further heated to 280° C. during 1 hour, then to 305° C. during the next 35 minutes whilst the pressure is released. The autoclave is allowed to cool under an atmosphere of nitrogen and the resulting copolyterephthalamide (inherent viscosity 0.83, vicat softening point 281° C.) rod spun into yarn which is drawn to 4.5 times its original length.

Yarn properties: Tenacity, 4.87 gms./denier; extensibility, 16.5%; initial modulus, 0.68.

EXAMPLE IV

Example I is repeated with the following starting materials:

5398 parts dodecamethylenediammonium terephthalate
1448 parts hexamethylenediammonium terephthalate
98 parts terephthalic acid
3000 parts distilled water.

The copolyterephthalamide obtained (inherent viscosity 0.67) is rod spun at 301° C. into yarn which is drawn to 5.5 times its original length over a hot plate at 200° C. After the properties of the yarn have been measured the latter is treated with boiling water which causes it to shrink by 5%. The properties are redetermined.

| Yarn properties | Before shrinkage | After shrinkage |
|---|---|---|
| Tenacity, gms./den | 7.22 | 6.45 |
| Extensibility, percent | 9.1 | 14.3 |
| Initial modulus | 0.74 | 0.59 |

Similar copolyterephthalamides are obtainable from the following parts by weight of reagents, by working in other respects according to Example 4:

| | Example V | Example VI |
|---|---|---|
| Dodecamethylenediammonium terephthalate | 1,677 | 1,500 |
| Hexamethylenediammonium terephthalate | 323 | 500 |
| Terephthalic acid | 28.6 | 29.4 |
| Water | 1,000 | 1,000 |

EXAMPLE VII

The copolyterephthalamide of Example IV is melt-spun by means of a screw extruder at 290° C. into a yarn consisting of 12 filaments. The yarn is drawn to 5.2 its original length over a snubbing pin at 80° C. followed by a hot plate at 197° C., and then has a denier of 75. It possesses the following physical properties.

Yarn properties: Tenacity, 6.9 gms./den.; extensibility, 7.9%; initial modulus, 0.82.

What is claimed is:
1. A fiber forming linear copolyterephthalamide consisting essentially of alkylene terephthalamide repeating units wherein the alkylene groups are a mixture consisting of dodecamethylene and 15 to 45 molar percent of a member of the group consisting of hexamethylene, heptamethylene, octamethylene, decamethylene, gammamethyl hexamethylene, gammamethyl heptamethylene and gammamethyl octamethylene.

References Cited
UNITED STATES PATENTS

| 2,752,328 | 6/1956 | Magat | 260—78 |
| 2,864,807 | 12/1968 | Nobis et al. | 260—78 |
| 3,294,758 | 12/1966 | Gabler | 260—78 |

HAROLD D. ANDERSON, Primary Examiner

U.S. Cl. X.R.
161—168; 260—31.2